Patented Nov. 29, 1949

2,489,358

UNITED STATES PATENT OFFICE 2,489,358

BENZOTRIAZINES

Frank J. Wolf, Westfield, and Karl Pfister, III, Elizabeth, N. J., assignors to Merck & Co., Inc., Rahway, N. J., a corporation of New Jersey No Drawing. Application January 10, 1947, Serial No. 721,475

6 Claims. (Cl. 260—248)

1

This invention relates to new chemical compounds having therapeutic activity; and to methods by which they may be prepared from readily available starting materials. More particularly, the invention relates to the preparation of 7-halogen-3-chloro - benzotriazine-1,2,4, and to the chemical compounds so produced, which are useful intermediates in the preparation of complex organic compounds including antimalarial agents and dyes.

The new compounds of the present invention are prepared from a 7-halogen-3-hydroxy-benzotriazine-1,2,4 which can readily be obtained by reduction of a 7-halogen-3-hydroxy-benzotriazine-1,2,4-oxide-1 in the manner disclosed in our companion application, Serial No. 721,474 filed January 10, 1947. The oxides can, in turn, be prepared by reacting a 4-halogen-2-nitroaniline with phosgene in organic solvent solution, treating the reaction mixture thus obtained with anhydrous ammonia to form the corresponding 4-halogen-2-nitrophenyl urea, reacting this product with sodium hydroxide and then acidifying to precipitate the desired product, as fully described in our companion application, Serial No. 721,470 filed January 10, 1947.

In carrying out the process of the present invention a 7-halogen-3-hydroxy-benzotriazine-1,2,4 is reacted with phosphorous oxychloride and a dialkyl aniline, preferably by heating the reaction mixture to reflux for about one-half hour. The reaction mixture is then poured into water causing precipitation of the corresponding 7-halogen-3-chloro-benzotriazine-1,2,4, which is recovered by filtration and washed with water. Purification can be effected by slurrying with acid, as for example, by slurrying the 3,7-dichloro-triazine-1,2,4 with hot, 6 N hydrochloric acid.

This reaction can be illustrated as follows:

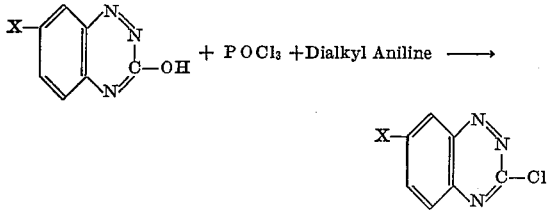

wherein X is halogen.

As an alternate method a 7-halogen-3-hydroxy-benzotriazine-1,2,4-oxide-1, prepared as above described, can be reacted with phosphorous oxychloride and phosphorous pentachloride, preferably by heating for about one hour at 150–160° C., and the reaction mixture then added to

2 water and extracted with benzene. Upon drying the benzene extract, concentrating to small volume, and adding petroleum ether the 7-halogen-3-chloro-benzotriazine-1,2,4 is recovered as a precipitate. This reaction can be represented as follows:

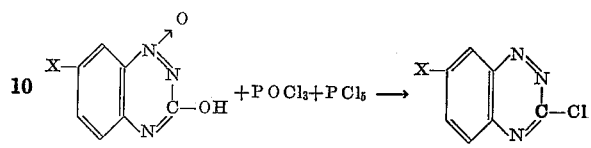

where in X is halogen.

The following examples show how processes of the present invention can be carried out, but it is to be understood that these examples are given by way of illustration and not of limitation.

Example 1

Two grams of 7-chloro-3-hydroxybenzotriazine-1,2,4 is refluxed for ½ hour with 8 ml. of dimethyl aniline and 16 ml. of phosphorous oxychloride. At the end of this time the mixture is poured into a water-ice mixture and the resulting precipitate is filtered and washed with water. The precipitate is slurried with 30 ml. of hot 6 N HCl and filtered. The precipitate of 3,7 dichloro-benzotriazine-1,2,4 is dried and weighs 1.6 gms., M. P. 140° C.

Example 2

0.5 gram of 7-chloro-3-hydroxybenzotriazine-1,2,4-oxide-1 is chlorinated with 4 cc. of POCl₃ and 1.0 gm. of PCl₅ by heating for 1 hour between 150–160° C. The solution is then poured into water for decomposition and extracted with benzene. The benzene solution is dried with Na₂SO₄, filtered, concentrated to a small volume, and precipitated with petroleum ether. About .3 gm. of 3,7-dichloro-benzotriazine-1,2,4 is obtained, M. P. 140° C.

Modifications can be made in the foregoing procedures without departing from the spirit and scope of the present invention, and we are to be limited only by the appended claims.

We claim:

1. 7-Halogen-3-chloro-benzotriazine-1,2,4.
2. 3,7-dichloro-benzotriazine-1,2,4.
3. The process for preparing 7-halogen-3-chloro-benzotriazine-1,2,4 that comprises reacting 7-halogen - 3 - hydroxy - benzotriazine-1,2,4 with phosphorous oxychloride and a dialkyl aniline.
4. The process for preparing 7-halogen-3-chloro-benzotriazine-1,2,4 that comprises heating to reflux a mixture of 7-halogen-3-hydroxy-benzotriazine-1,2,4, phosphorous oxychloride, and dimethyl aniline.

5. The process for preparing 3,7-dichloro-benzotriazine-1,2,4 that comprises reacting 7-chloro-3-hydroxy-benzotriazine-1,2,4 with phosphorous oxychloride and a dialkyl aniline.

6. The process for preparing 3,7-dichloro-benzotriazine-1,2,4 that comprises reacting 7-chloro-3-hydroxy-benzotriazine-1,2,4 with phosphorous oxychloride and dimethyl aniline.

FRANK J. WOLF.
KARL PFISTER, III.

REFERENCES CITED

The following references are of record in the file of this patent:

UNITED STATES PATENTS

| Number | Name | Date |
|---|---|---|
| 1,904,229 | Heintrich | Apr. 18, 1933 |
| 2,197,357 | Widmer | Apr. 16, 1940 |
| 2,235,480 | Graenalber | Mar. 18, 1941 |

OTHER REFERENCES

Bischler Berichte 22 (1889), pp. 2817 and 1818, 2806.

Arndt Berichte 50 (1917), pp. 1248–1262.

Parkes, Chem. Soc. J., pp. 1842 and 1843 (1938).